(12) United States Patent
Martinent et al.

(10) Patent No.: US 8,073,937 B2
(45) Date of Patent: Dec. 6, 2011

(54) DATA DOWNLOADING INITIATED BY PORTABLE COMMUNICATING OBJECTS DURING A CAMPAIGN

(75) Inventors: Frédéric Martinent, Marseilles (FR); Eric Bretagne, Luynes (FR); Patrice Amiel, Aix-lesmilles (FR)

(73) Assignee: Gemalto SA, Meudon (FR)

( * ) Notice: Subject to any disclaimer, the term of this patent is extended or adjusted under 35 U.S.C. 154(b) by 280 days.

(21) Appl. No.: 11/989,577

(22) PCT Filed: Jul. 28, 2006

(86) PCT No.: PCT/EP2006/064770
§ 371 (c)(1),
(2), (4) Date: Aug. 25, 2009

(87) PCT Pub. No.: WO2007/012662
PCT Pub. Date: Feb. 1, 2007

(65) Prior Publication Data
US 2010/0017499 A1 Jan. 21, 2010

(30) Foreign Application Priority Data
Jul. 28, 2005 (FR) ..................... 05 52365

(51) Int. Cl.
G06F 15/177 (2006.01)
G06F 9/44 (2006.01)
H04B 1/18 (2006.01)
(52) U.S. Cl. ................... 709/221; 455/418; 717/173
(58) Field of Classification Search .............. 709/221; 717/173; 455/418
See application file for complete search history.

(56) References Cited

U.S. PATENT DOCUMENTS

| 6,549,773 | B1 * | 4/2003 | Linden et al. ............. 455/426.1 |
| 6,577,614 | B1 | 6/2003 | Cook et al. |
| 6,776,339 | B2 * | 8/2004 | Piikivi ........................ 235/451 |
| 7,174,174 | B2 * | 2/2007 | Boris et al. .................. 455/461 |
| 7,747,997 | B1 * | 6/2010 | Rao ............................ 717/170 |
| 2005/0085244 | A1 * | 4/2005 | Choi et al. .................. 455/466 |

FOREIGN PATENT DOCUMENTS

EP  1 528 723 A  5/2005
WO  WO 2005/050441 A  6/2005

OTHER PUBLICATIONS

Wireless Application Protocol Forum, Ltd. "Push OTA Protocol", Version Apr. 25, 2001, Wireless Application Protocol WAP-235-PushOTA-20010425-a, Apr. 25, 2001, 44 pages.*
Sun Microsystems, Inc. "Over the Air User Inititated Provisioning Recommended Practice for the Mobile Informaiton Device Profile", Version 1.0, May 7, 2001, 24 pages.*
PCT/ISA/210 for PCT/EP2006/064770 dated Sep. 12, 2006.

* cited by examiner

Primary Examiner — George Neurauter
(74) Attorney, Agent, or Firm — Buchanan, Ingersoll & Rooney PC

(57) ABSTRACT

Content data available in a server is downloaded to portable communicating objects via a radio communication network during a data downloading campaign initiated by a portable communicating object upon transmission of a request of content availability to the server when at least one request transmission triggering element fulfills a rule stored in the portable communicating object. Upon reception of the content availability request, one of the devices including the server and the portable communicating object determines whether the content data are available for the portable communicating object so as to transmit the same thereto.

10 Claims, 5 Drawing Sheets

DATA DOWNLOADING INITIATED BY PORTABLE COMMUNICATING OBJECTS DURING A CAMPAIGN

The present invention relates to the downloading of data from a server in portable communicating objects via a radio communication network during a downloading campaign. More particularly, it concerns a downloading of data initiated by portable communicating objects. The communicating objects are chip cards, such as UICC cards (Universal Integrated Circuit(s) Card) provided with the USIM (Universal Subscriber Identity Module) application, associated with the mobile terminals of the radio communication network which can be, for example, of the GPRS (General Packet Radio Service) or UMTS (Universal Mobile Telecommunications System) types.

The data downloading server, also called the OTA (Over The Air) card management platform, comprises software which makes it possible for the operator managing the radio communication network to keep the control of the chip cards in the mobile terminals and to modify their contents. Such operations initiated by the operator (push mode) for example relate to the downloading of a file in predetermined cards in the stock managed by the operator, or the downloading or erasing of a determined application, or the modification of data from a file or from a determined application in cards managed by the operator.

The invention more particularly concerns a massive downloading campaign of data in users' cards, although the OTA data downloading server can make a unit downloading in a user's card.

According to a first example, the downloading concerns a single personal file which is intended for roaming users, which are often abroad, and which contains more than ten preferred network identifiers managed by operators, whom the network operator managing the cards entered into an agreement with. The file of preferred network identifiers is unique and is intended to be downloaded in many predetermined users' cards, such that the users of such cards can use it when they are abroad.

For this first example, the operator has currently two possibilities for downloading such file from the OTA server. According to a first possibility, the operator decides to download the file in a unitary way, as it comes, the first time an interested user is roaming, and so on, in turn, for all the users who are roaming. According to a second possibility, so called in campaign mode, the server transmits the file of the preferred network identifiers during only one campaign to the cards the users of which subscribed to a roaming option.

In campaign mode, the number of targeted users can reach several hundreds of thousands or millions.

According to a second example, a downloading relates to an application facilitating the management of phone books in the cards. Such an application makes it possible for a user to save the whole of his/her phone book in a predetermined server managed by the operator, each time the user saves a new phone number in his/her card.

According to this second example, three possibilities exist. Further to an advertisement shown on television, the user calls the call center, during the day, to request it to download the application into his/her card. Such operation is a unit operation triggered in the OTA server by the operator in a so-called "Customer Care" mode. According to a second possibility, the user takes the initiative of commanding downloadings by consulting the operator's site from his mobile terminal, so as to trigger the downloading of the application into the card. Such downloading is also a unit operation commanded in the OTA server by the user in a so-called "Self Care" mode. According to a third possibility, the operator triggers a downloading operation in campaign mode on more than one million targeted users such that the OTA server manages the downloading of the application into the million cards.

For all the above mentioned downloading operations from the OTA downloading server, the setting up of a communication channel between the server and a card during a downloading campaign is decided by the operator and initiated in the server. Such downloadings are operated in "push mode".

According to a first embodiment of the push mode, the downloading is carried out upon the transmission of a series of short messages SMS, formatted by the downloading server as a function of a known protocol, to a card, then transmitted to the card via the operator's communication network of the GSM type. This operation is described in the French patent application 0410225, filed on Sep. 27, 2004 by the applicant and not published, entitled "Campagne de téléchargement de données dans des objets communicants portables" (Data downloading campaign in portable communicating objects). The setting up of the communication of the push mode which requires the use of the SMS technology is a disadvantage for the networks, the infrastructures of which cannot deal with short messages or for which the short messages do not satisfy the standards required for a remote updating, for example of cards in Code Division Multiple Access (CDMA) networks. Another disadvantage is the unavailability of the cards, the terminals of which are off or out of the coverage of the radio communication network during the campaign.

To remedy such disadvantages, a second embodiment illustrated in FIG. 1, according to the invention, consists in a downloading from the fixed part of a new generation radio communication network of the GPRS or UMTS type, via a data channel of the IP (Internet Protocol) type.

A downloading server ST initiates a campaign, at step S1, for downloading data D to many cards upon the transmission, at step S2, of a short message, so-called a "push SMS" towards the cards. The SMS message contains an identifier Idap of the application concerned by the campaign and as an option, the address AdST of the downloading server ST. As soon as a card C receives the SMS message, it opens, at steps S3 to S6, a channel for communicating with the mobile terminal T which accommodates the card, and a gateway P of the GGSN (Gateway GPRS Support Node) type of a data network. At step S3, the card transmits a request RQ to the terminal T to open a communication channel. The terminal T transmits, at step S4, a request to set up a connection of the IP type to the gateway P of the radio communication network. At step S5, the gateway P transmits to the terminal T a response RP indicating that the IP connection is setup. At step S6, the terminal transmits to the card an answer indicating that the communication channel is open. Thus, at step S7, the card opens a session for directly communicating with the downloading server ST which downloads, at step S8, the content D defined in the campaign to the card C. The latter updates an application AP concerned by the downloading at step S9 and transmits, in response, at step S10, the result of the downloading to the server ST. Upon completion of the downloading, at step S11, the server ST closes the session for example upon the transmission of a session closing request. Upon reception of the session closing request, the card closes its communication channel with the terminal and the gateway P, at steps S12 to S15, similar to steps S3 to S6.

The push mode implies a few constraints or limits related to the availability of the cards on the radio communication network. The requests for downloading for all the unavailable cards are considered as failed and are subsequently processed by a new try mechanism. Upon the completion of the campaign, all the cards have not been reached since some cards are not connected to the network during the new try period.

During a downloading in campaign mode, the very frequent change of assignment of a part of the cards is not taken into account in the management by the server of a list of targeted cards. As a matter of fact, during the downloading campaign, new subscribers and thus new cards arrive in the network, existing subscribers change cards and unused cards or cards used in other networks no longer appear in the network. Consequently, as the campaign lasts from several days to several months, the list of targeted cards is not updated again during the whole duration of the campaign.

Besides, a downloading campaign is often carried out in a massive way (a few million cards), on a relatively short duration, which can last from a few days to a few months, and thus causes a traffic peak in the radio communication network. During this period, the network is submitted to an important stress and requires a well-dimensioned infrastructure capable of supporting a temporary overload. The management of the new tries without knowing whether the mobile terminal carrying the card has come back within the coverage of the network still increases the network overload.

The object of the invention is to remedy the above-mentioned disadvantages by changing the current "push" mode for a card interrogation mode which initiates, during a downloading campaign, a communication with a downloading server, in order to obtain a content made available by the operator of the radio communication network. This solution has the advantage, among others, of eliminating the management of new tries by the downloading server and of avoiding the traffic peak caused by the campaign in the radio communication network.

To reach this object, a method for downloading content data available in a server mean to portable communicating objects during a data downloading campaign, comprising the initiation in a portable communicating object of a data downloading to said object upon transmission of a content availability request to the server mean, as soon as at least one request transmission triggering element fulfills a rule stored in the portable communicating object, is characterized in that it includes, in the portable communicating object, steps of determining, upon reception of the content availability request, whether content data are available by comparing data characterizing the portable communicating object with content descriptions which are associated with the content data stored in the server means and transmitted by the server means in response to the content availability request, and of transmitting content identifiers relating to the determined available content data, such that a server means transmits said determined available content data to the portable communicating object.

The invention offers a better distribution of the network load, the communications between the portable communicating objects and the server mean during the downloading campaign occurring, as dictated by the request transmission triggering elements, in the communicating objects, as predetermined events in each of the communicating objects independently from the predetermined events in the other communicating objects, and not in a systematic way. The invention is also advantageous because of a significant reduction of the risks of failures of the updating operations of the portable communicating objects, since the latter initiate the downloading only when they are within the coverage of the radio communication network.

According to a first embodiment of the invention, when one of the devices is the portable communicating object, upon reception of the content data from the server means, the portable communicating object processes the received content data and transmits a notification to the server means.

Another advantage of the invention consists in getting free from the management of the communicating object lists in the server means, the downloading of content data occurring on functional and structural characteristics of the communicating objects; for example, data are downloaded to all the portable communicating objects having a specific profile or to all the communicating objects which have enough room in the memory to accommodate a new application.

Another object of the invention is a system for downloading content data available in a server means to a portable communicating object via a radio communication network during a data downloading campaign. The communication system is characterized in that it includes, in each portable communicating object, a mean for initiating a data downloading to said object upon the emission of a content availability request to the server means as soon as at least one request transmission triggering element fulfills a rule stored in the portable communicating object, and means in one of the devices including the server mean and the portable communicating object to determine, upon reception of the content availability request, whether content data are available for the portable communicating object in order to transmit them thereto.

The communicating objects can be users' chip cards removable from mobile terminals, or mobile terminals.

According to a preferred embodiment, the system includes a code division multiple access network, for example UMTS or UTRAN. According to another embodiment, the system includes a GSM network backed by a GPRS network.

The invention may not resort to an infrastructure comprising a short messages server. The system of the invention may comprise a packet network without using short messages.

Finally, the invention relates to a program capable of being implemented in the communication system for downloading content data available in a server mean to portable communicating objects via a radio communication network during a data downloading campaign. The program includes instructions for the initiation by a portable communicating object of a data downloading to said object upon transmission of a content availability request to the server means as soon as at least one request transmission triggering element fulfills the rule stored in the portable communicating object and instructions for determining in one of the devices including the server mean and portable communicating object upon reception of the content availability request whether content data are available for the portable communicating object in order to transmit them thereto.

Other characteristics and advantages of the present invention will become evident upon reading the following description of several preferred embodiments of the invention which are given as non-limitative examples, and referring to the appended drawings which corresponds, wherein.

Figure 4:
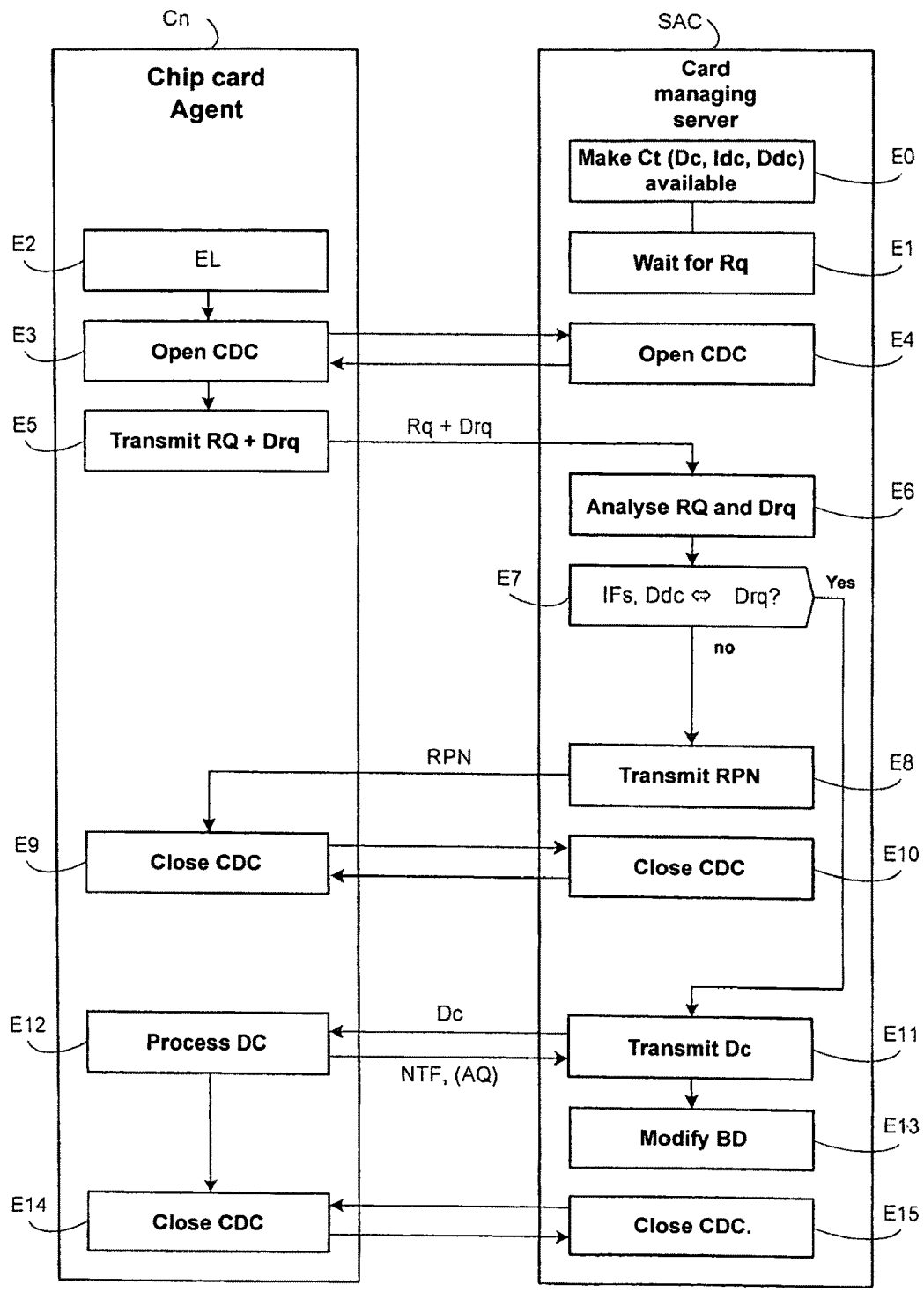
Figure 5:
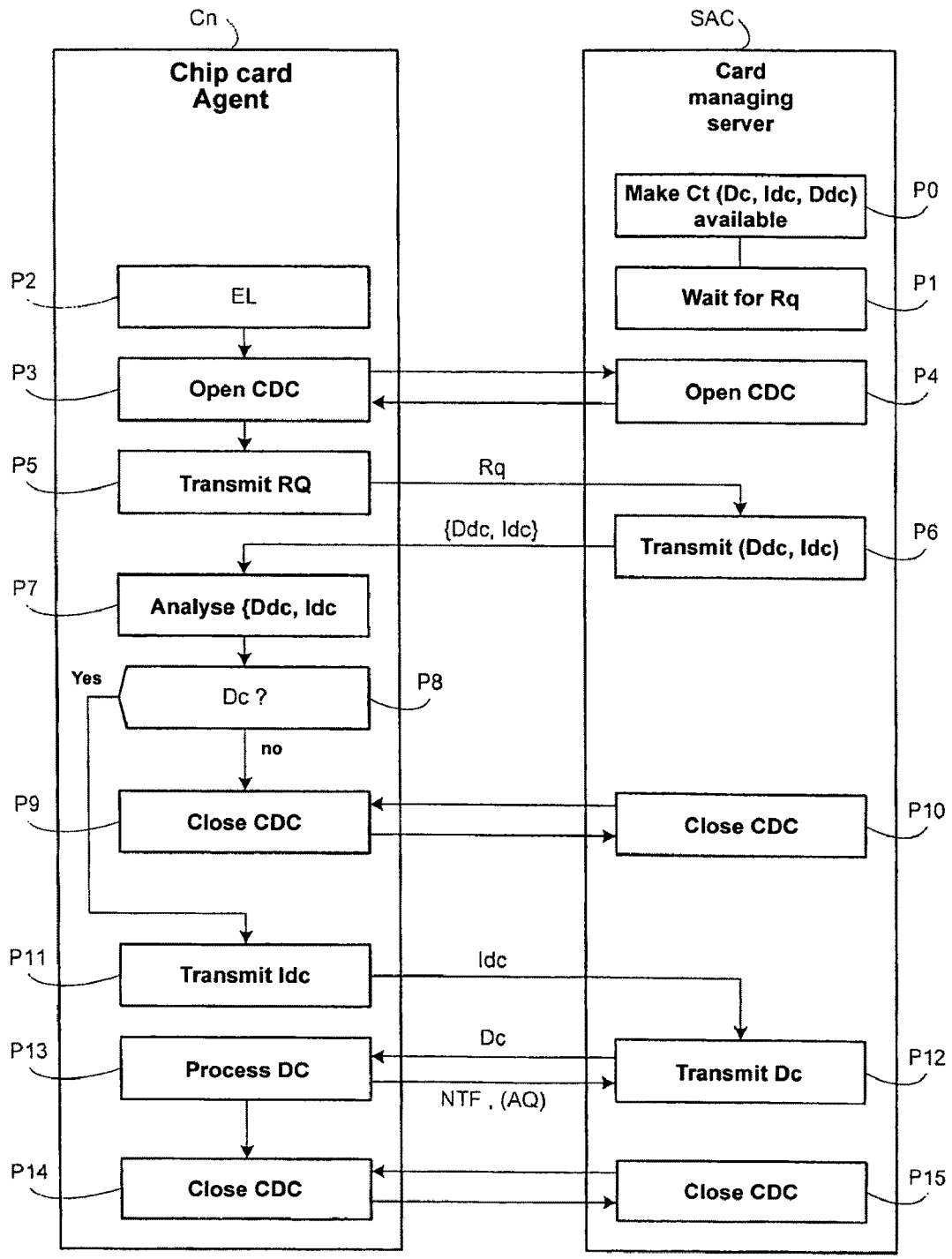

FIG. 4 is an algorithm of a first embodiment of the downloading method of the invention, with exchanges of requests and answers between the managing server and the portable communicating object; and FIG. 5 is an algorithm of a second embodiment of the downloading method according to the invention, with exchanges of requests and answers between the managing server and the portable communicating object.

Figure 2:
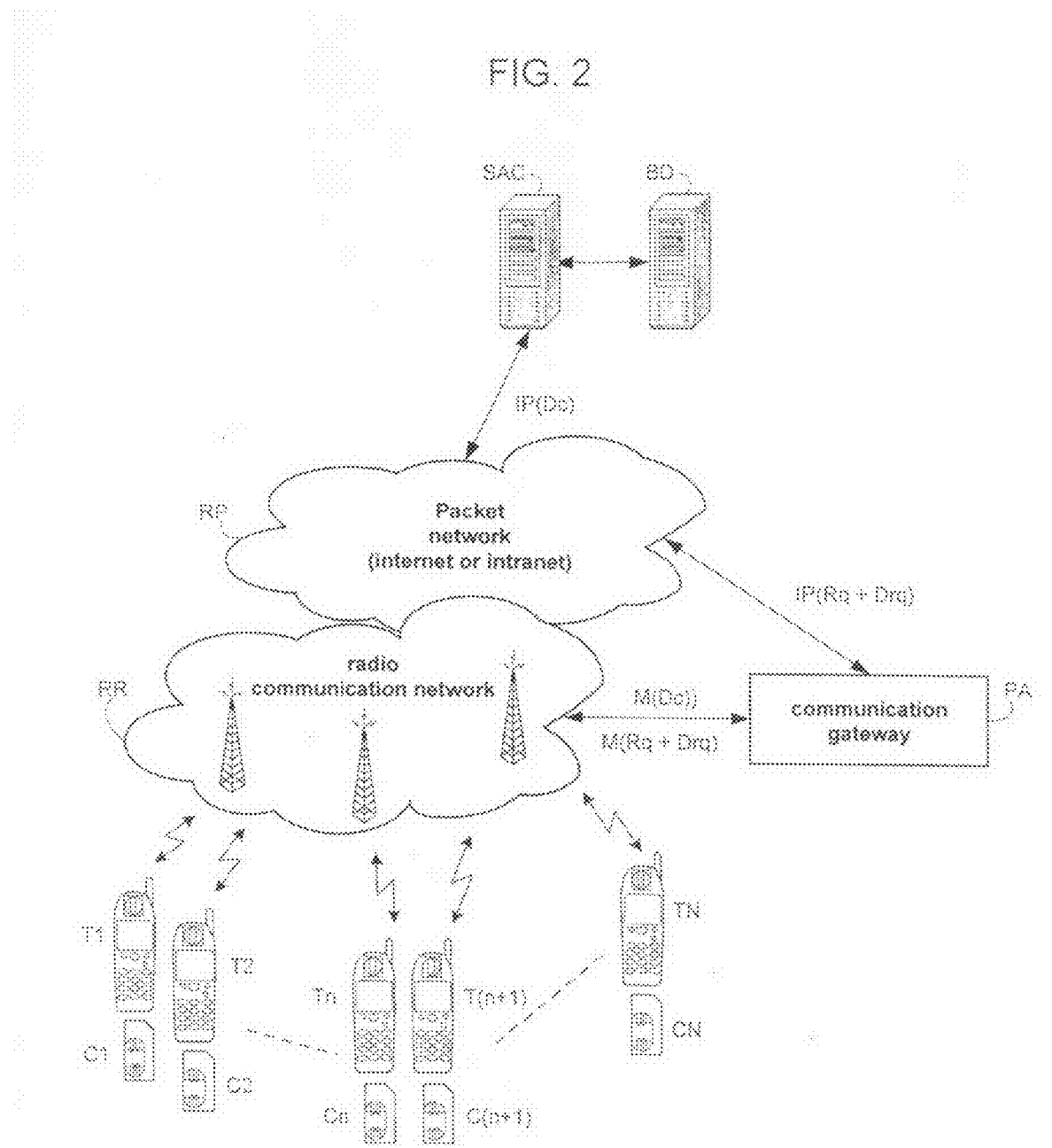
FIG. 2 is a schematic block-diagram of a communication system connecting portable communicating objects and a communicating object managing server managed by a network operator for the implementation of the downloading method according to the invention.

In FIG. 2 are shown main means for downloading data in portable communicating objects, such as removable users' chip cards C1 to Cn, which are associated respectively to mobile radio terminals T1 to TN, connected to a digital cellular radio communication network RR. The chip card Cn associated with the mobile terminal TN, with the index n such that $1 \leq n \leq N$, is of the UICC (Universal Integrated Circuit Card) type. The chip card is provided for example with a SIM (subscriber identity Module) application, when the network RR is of the GSM type or a USIM (Universal Subscriber identity module) application, when the network RR is a CDMA (Code Division Multiple Access) network of the third generation (3GPP) of the UMTS (Universal Mobile Telecommunications System) type or UTRAN (UMTS Terrestrial Radio Access Network) type.

a card management server SAC according to the invention is managed by the operator of the network RR and constitutes an OTA (Over The Air) platform. According to the embodiment illustrated in FIG. 2 to which reference will be made hereinafter, the cards C1 to Cn associated with the respective mobile terminals T1 to TN transmit content availability requests RQ which can be followed by associated data Drq to the server SAC and receive content data Dc transmitted by the server SAC through a communication gateway PA.

The gateway includes an access gateway for communicating with the server SAC through a High bit rate network packet RP, such as the internet, or such as an intranet network belonging to the operator of the network RR. Another access gateway of the communication gateway PA communicates with at least one mobile service switch, very often through an access network such as a packet network of the X.25 type or an ISDN (Integrated Services Digital Network) network or an ATM (Asynchronous Transfer Mode) network. The content availability request Rq and the associated data Drq are transported in messages M by a mobile terminal TN to the server SAC, and are formatted in the gateway PA into IP (Internet Protocol) packets transmitted to the server SAC; reversely, content data Dc are transmitted in IP packets by the server SAC to the mobile terminal TN and are routed by the gateway PA in form of messages M to the terminal TN.

The messages M may encapsulate the IP packets which include a request Rq and data Drq. The gateway PA extracts the IP packets from the messages M transmitted by the terminal TN to transmit them to the server SAC. Reversely, the IP packets from the server SAC are encapsulated in messages M to be transmitted by radio to the terminal TN.

As an alternative, the communication gateway PA is directly connected to or is integrated in a mobile service switch in the RR network.

According to another embodiment, the communication gateway PA is an access network of the packet switching network type with the management of mobility and access by radio GPRS (General Packet Radio Service), if the radio communication network RR is of GSM type. A SGSN (Serving GPRS Support Node) service node of the GPRS network is connected to at least one base station controller of the network RR. A GGSN (Gateway GPRS Support Node) gateway node of a GPRS network is connected to the packet network RP serving the server SAC. The interest of this embodiment consists in transmitting messages in the form of packets with much higher rates.

According to still another embodiment, the communication gateway PA is used for exchanging messages between the mobile radio terminals and the server SAC through the networks RR and RP according to a high rate packet connection of the internet type.

In the radio communication network RR of the UMTS type or the GSM type backed by a GPRS network, a content availability request Rq associated with data Drq and the content data Dc are exchanged between a mobile terminal Tn and the associated card Cn according to the BIP (Bearer Independent Protocol) protocol or through a dedicated midlet application which is aboard the terminal which communicates with the card via a specific application protocol such as the J2ME (Java 2 Mobile Edition) protocol, for example. The content availability request Rq associated to data Drq and the content data Dc are, for example, exchanged between the card Cn and the server SAC according to the CAT-TP (Card Application Toolkit-Transport Protocol) transport protocol on a UDP/IP (User Datagram Protocol/Internet Protocol) link.

Figure 3:
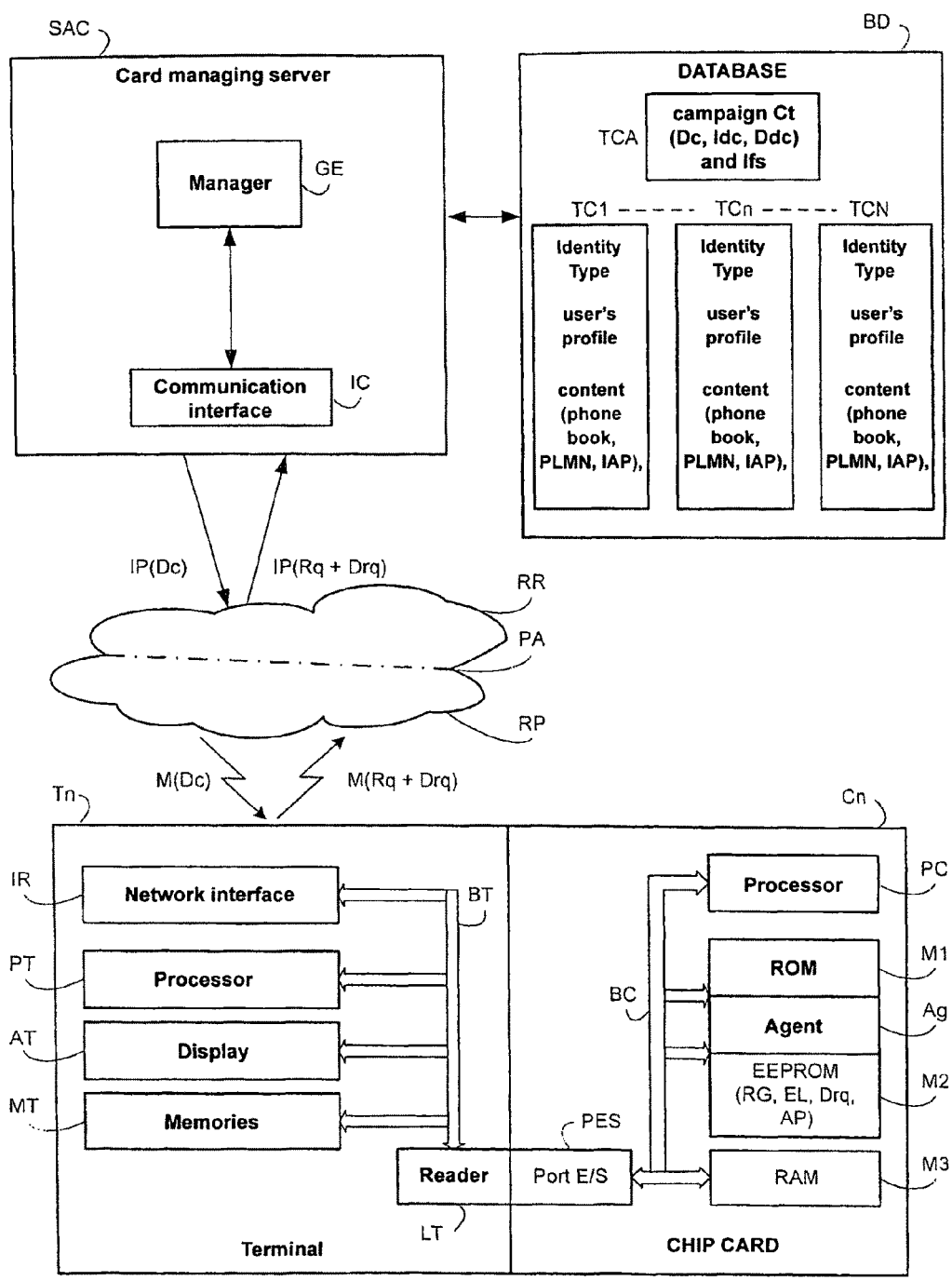
FIG. 3 is a schematic block-diagram with more details, relating to FIG. 2.

Referring to FIG. 3, the management server SAC, the terminal Tn and the chip card Cn are shown in the form of functional blocks, most of which provide functions linked to the invention and may correspond to software and/or hardware modules.

The management server SAC comprise a manager GE which manages various operations during downloading and a communication interface IC for the transmission and reception of IP packets through the packet network RP.

The card management server SAC is connected to a data base BD including various parameters and characteristics of cards managed by the operator of the radio communication network RR.

Each chip card Cn is associated with a table TCn in the data base BD. The table TCn more particularly comprises initial characteristics which are linked to the identity of the card Cn and to the type of the card, and which are saved in the data base BD as from the first use of the card. Such initial characteristics are, more particularly, a card series number, the IMSI (International Mobile Subscriber Identity) international identity of the card user, and the MSISDN (Mobile Station ISDN Number) mobile user phone number.

The type of the card Cn is more particularly defined by an identifier of the processor type included in the card, the card manufacturer identifier and a number of bits per word processed by the processor, characteristics of the operation system and the virtual machine implemented in the card etc.

Other characteristics which are specific to the utilization of the card and more particularly the user's terminal Tn can also be saved in the table TCn associated to the card Cn upon the first utilization of the card and can be modified upon the utilization of the card. Such other characteristics more particularly concern the subscriber's profile of the user of the card Cn, data which can be modified by the user or by the operator managing the card such as a phone book and mail addresses, and for example a PPLMN (Preferred Public Land Mobile Network) favorite radio communication network identifier file. Such networks identified in the PPLMN file are managed by operators with whom the operator of the network RR, which the card Cn is connected to, entered into agreements, such that the user of the card Cn can communicate through such networks when the user is roaming in territories covered by such networks.

The table TCn also contains one or several applications identifiers IAP which have been loaded upon the first utilization of the chip card Cn and/or have been subsequently downloaded, after the first utilization thereof. For example, an application consists in modifying the preferred PPLMN network identifier file. According to another example, the application consists in erasing or downloading an application in the card Cn, for example for facilitating the management of the phone book in the card Cn and allow the user, every time he/she saves and new phone number in the card, to save the whole phone book in a specific server managed by the operator, such that the user can find his/her saved phone book, when he/she loses the card Cn, or when he/she changes cards. Another application can be used for modifying parameters in an already downloaded application in the card Cn; for example, the parameters to be modified are an updating of the reloading tariffs and communication taxes when the user has subscribed a prepaid account.

The data base BD or as an alternative, the server SAC also contains one or several campaign table(s) TCA which are respectively assigned to campaigns. Each campaign table TCA includes one or several content(s) Ct to be downloaded to the cards. Each content Ct contains content data Dc to be downloaded. The content data are, for example application updating data, or an advertisement. Each content Ct also contains a description Ddc of data Dc and an identifier Idc of the content Ct.

Each table TCA also includes selection information IFs to be compared either to the data Drq sent by the card, or to the Cn card characteristics stored in the table TCn, in order to decide whether a downloading must be performed or not. The information IFs are, for example, an identifier IAP of a new version of an application to be updated in the card, the authorized updating credit threshold, or a list of the MSISDN telephone numbers and addresses of the tables associated with the cards targeted by the campaign, which are supposedly the N cards C1 to Cn hereinafter and the active hours of the campaign.

The data base BD can be integrated into the card managing server SAC or be independent in the form of a data base management server which is connected to the server SAC by a packet network such as the network RP, which means via the internet or via an intranet network which belongs to the operator of the network RR.

The terminal Tn includes, in addition to the card reader LT, more particularly a processor PT, memories MT, a display AT such as a screen connected to or integrated in the terminal and more particularly associated with a keyboard connected to or integrated in the terminal or network interface IR. The various elements of the terminal are connected to one another by a bi-directional bus BT.

The chip card Cn mainly comprises a processor PC or several processors and three memories M1 to M3. The card exchanges commands or requests and answers with the terminal T through an inlet/outlet port PES and the reader LT with or without contact. The various card elements are connected together by a bi-directional bus BC.

The memory M1 is of the ROM or Flash type and includes the card operation system.

The memory M2 is a nonvolatile for example EEPROM or Flash memory in order to more particularly store keys identity number and other profile parameters of the user who owns the card such as a PIN code or other safety data. The memory M2 also comprises applications AP of the card.

The memory M2 comprises triggering rules RG which manage the triggering of a content availability request on the basis of one or several triggering elements EL. Such triggering elements are for example, time stamping data supplied by a daily, weekly or monthly time base and/or external events indicators such as the starting of the terminal, the reception or the transmission of a call, or the starting of an application AP by the user and/or control indicators deduced from a control on the environment of the card relating to a change of terminal, a passage to roaming or a change of geographic zone. Such control indicators are coupled to event indicators in order to trigger an interrogation mode by the card. The triggering rules RG can be modified over time by the card managing server SAC.

The memory M2 also comprises data Drq which are either linked to the rules triggering the request Rq such as for example a change of geographic zone, where the terminal is, or linked to an application AP residing in the card such as for example, an identifier IAP of the application version, or connected to a mobile terminal/network environment such as, for example the card type.

The memory M3 is a RAM or SRAM memory more particularly used for the processing of data.

The card Cn comprises, in addition to the invention a software module called agent Ag distributed in the memories M1 and M2. When one or several triggering element or elements EL fulfill(s) a triggering rule RG, the agent Ag transmits the content availability request Rq and the data Drq to the server SAC and receives the content data Dc and processes them. The agent Ag also manages the opening and closing of a communication channel between the card Cn and the server SAC.

In an alternative solution, the agent Ag can be distributed into several individual agents included respectively in some applications and each having functionalities with respect to the respective application which are equivalent to those of the general agent Ag to which reference will be made hereinafter, for example.

Referring to FIG. 4, a first embodiment of the downloading method initiated by the card Cn according to the invention comprises steps E0 to E15.

At the initial step E0, the operator of the radio communication network RR makes available one or several content(s) Ct in the data base BD, the data of which must be downloaded during a campaign TCA of data downloading common operations from the card administration server SAC to a set of specified or filtered cards according to the selection information IFs.

When the contents Ct, which each comprise content data Dc, a description Ddc and a content identifier Idc are available, the manager GE waits for the reception of a content availability request Rq from a chip card, at step E1.

Figure 1:
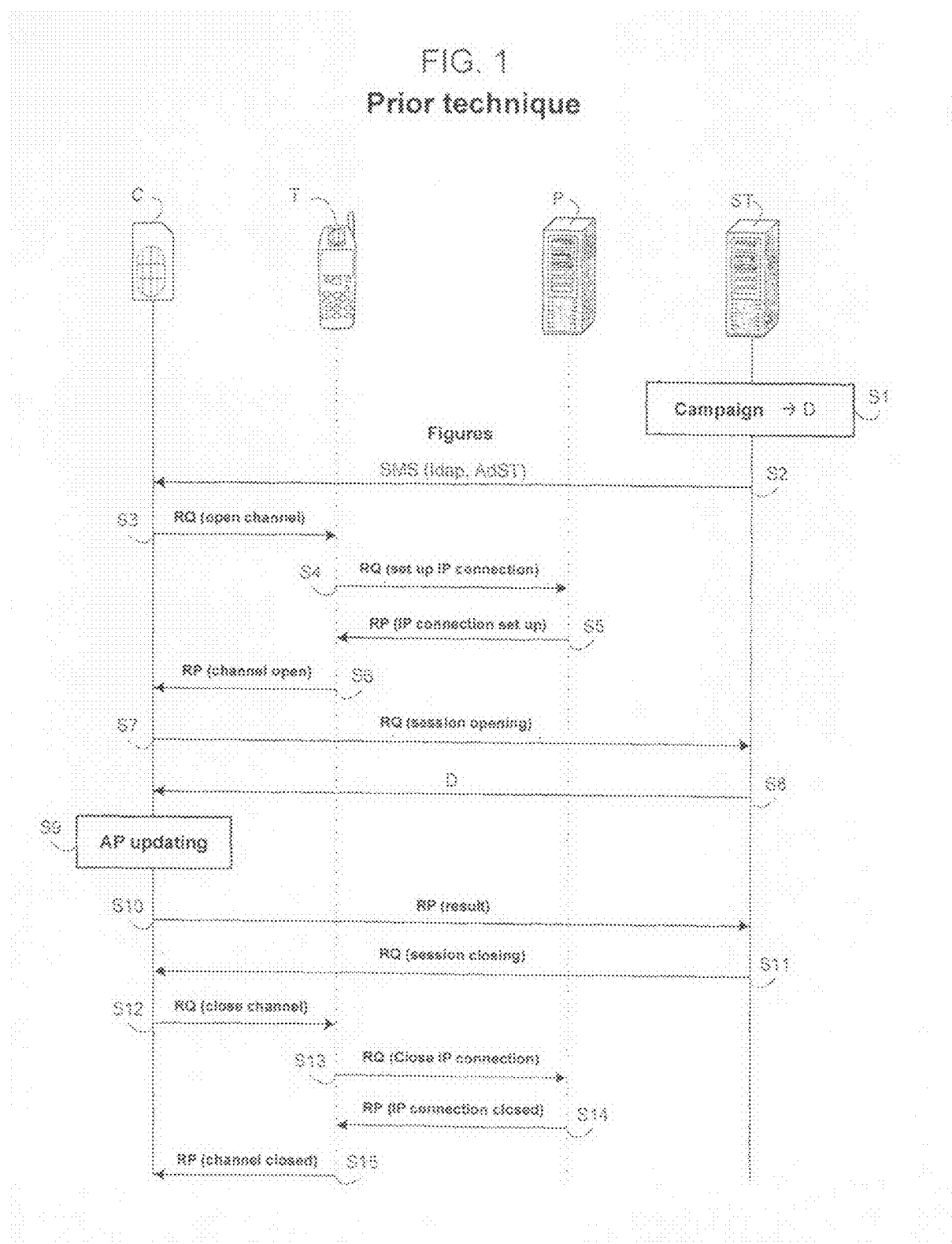
FIG. 1 is an algorithm of a data downloading method according to the prior technique, initiated by a card downloading server to a chip card, with an exchange of requests and answers between the downloading server and the chip card.

At step E2, one or several triggering element(s) EL fulfilling a rule RG stored in card Cn are detected by the agent Ag of the card Cn, such as for example the starting of the terminal Tn or a predefined time elapsed. Thus, at steps E3 and E4, the agent Ag opens a communication channel CDc with the server SAC, via the radio communication network RR and the packet network RP. The opening of the channel CDc between the card Cn and the server SAC includes steps similar to steps S3 to S6 described hereabove while referring to FIG. 1.

At step E5, the agent Ag makes a content availability request Rq and associates it to data Drq. The agent can mutualize the content of several applications of the card Cn into a single request Rq by including into data Drq a list of parameter relating to the concerned applications. The agent Ag of the card Cn commands the transmission of the request Rq and the data Drq in the form of a message M from the network interface IR of the terminal Tn. The request Rq and the data Drq are then extracted from the message M and transmitted via the gateway PA to the server SAC.

At step E6, the communication interface IC of the server SAC receives the request Rq and the data Drq. The manager GE of the server SAC determines whether content data Dc from one or several content(s) Ct are available for a chip card Cn, through an analysis of data Drq as a function of the selection information IFs and/or the descriptions of the content Ddc of each content Ct. At step E7, the manager GE compares the data Drq received to the selection information IFs and/or to the descriptions of the content Ddc stored in the table TCA. If no content data is available for the card Cn which means for example if the information IFs do not include the IMSI identity of the card among IMSI identities of the card selected for the downloading campaign, then the manager GE transmits through the interface IC, at step E8, a response RPN to the card Cn indicating that no data Dc is available therefor.

Upon reception of the response RPN, the agent Ag in the card Cn closes the communication channel CDc with the server SAC, at steps E9 and E10. The closing of the channel CDc between the card Cn and the server SAC includes steps similar to steps S12 to S15 described here-above while referring to FIG. 1.

On the contrary, if data Drq correspond to the information IFs and/or the description Ddc of a content Ct available at step E7, then the manager GE transmits, at step E11, all or a part of the content data Dc of the content Ct. Such data Dc are transmitted through the communication interface IC of the server SAC in IP packets to the mobile terminal Tn coupled to the card Cn and are routed by the gateway PA in the form of one or several messages M to the terminal Tn.

Upon reception of such data DC, the agent Ag in the card Cn processes the data Dc received for each concerned application, at step E12. According to a first example, the agent Ag updates the application(s) AP linked to the triggering elements detected at step E2. According to another example, the data Dc are advertisement data to be displayed on the display AT of the terminal Tn.

Then, at steps E14 and E15, the communication channel CDC between the card and the server SAC is closed in the same way as at steps E9 and E10.

At step E12, a notification NTF can be transmitted to the server SAC by the card Cn, prior to the closing at E14-E15 of channel CDC. The notification NTF prevents the contents to be transmitted a second time to the card Cn. Thus, upon reception of the notification NTF at step E11, the server SAC confirms by a modification in the data base BD at step E13, that the content available has already been downloaded into the card Cn.

A concrete application of the method of the invention is the updating of a service portal of the user of the card Cn. The operator of the network RR wishes to update a set of cards, but each user has only a limited updating credit of its portal. The operator makes available on the server SAC, as a description of the content Ddc relating to the content Ct, information described being the targeted portal for example the version number of the portal and as selection information IFs triggering elements relating to the validation of the downloading, for example a sufficient updating credit.

The content availability request Rq transmitted by the card Cn is appended with data Drq including the current portal version as well as the number of updating still possible in the card.

Upon reception of the request Rq and data Drq, the manager GE of server SAC first checks that there is a real need for updating the portal by comparing version number of the portal included in the description Ddc and the version number of the portal included in the data received Drq. Then the manager checks whether it is still possible for the user of the card Cn to update its portal by checking the number of still authorized updates comprised in the later received Drq as a function of the information IFs.

If the number of authorized updatings is equal to the updating credit of the information Ifs, then the server SAC reduces the updating credit and transmits the portal updating data of the service to the card Cn, which reduces the number of updatings.

According to another example, an application relates to the pay-as-you-go television on mobile terminal for which the agent updates the access rights to television programs for the card user.

According to an alternative solution relating to steps E5 to E7 of the first embodiment of the method of the invention, the analyzes and the comparison at steps E6 and E7 are no longer carried out as a function of data Drq transmitted with the request Rq, but as a function of the card characteristics included in the table TCn stored in the data base BD.

Thus, at step E5, the agent Ag makes a content availability request Rq without associating data Drq and commands the transmission of the request Rq from the network interface IR of the terminal Tn to the server SAC.

At steps E6 and E7, the communication interface IC on the server SAC receives the request RQ. The manager GE of the server SAC determines whether content data Dc from one or several content(s) Ct are available for the chip card Cn by searching the card characteristics Cn stored in the table TCn, as a function of the selection information IFs and/or a descriptions of contents-Ddc of the contents Ct.

FIG. 5 illustrates a second embodiment of the data downloading method of the invention. The algorithm shown in FIG. 5 includes steps P0 to P15. In this second embodiment, the server SAC is not connected to a data base and comprises, in addition to the manager GE and the communication interface IC, a memory containing the campaigns tables TCA. Each campaign table TCA comprises one or several content or contents Ct, each including content data DC, a content description Ddc and a content identifier Idc.

Steps P0 to P4 are identical to steps E0 to E4 referred to in FIG. 3.

At step P5, the agent Ag makes a content availability request Rq and commands the transmission of the request Rq, in the form of a message M from the network interface IR of the terminal Tn. The request Rq and the data Drq are then extracted from a message M and transmitted via the gateway PA to the server SAC.

At step P6, in response to the request Rq, the server transmits the couples {DDC, Idc} of all the contents Ct which are available at step E0.

Upon reception of the couples {DDC, Idc}, the agent Ag analyzes, at step P7, the descriptions Ddc transmitted as a function of the content of the card for example as a function of the data Drq stored in the memory M2 or as a function of the characteristics or identifiers IAP of the applications is implemented in the card Cn. The agent Ag thus determines whether content data must be downloaded at step P8.

When no content data is to be downloaded, the agent Ag in the card Cn closes the communication channel CDC with the server SAC at steps P9 and P10 in the similar way as at steps E9 and E10 while referring to FIG. 4.

On the contrary, at step P8, if data Dc must be downloaded, then the agent Ag transmits to the server SAC the identifier/ identifiers IDc relating, respectively, to one or several content(s) Ct including the requested data DC, at step P11.

At step P12, the manager GE of the server SAC transmits the data Dc relating to the received identifiers Idc.

Upon reception of such data DC, the agent Ag of the card Cn processes the data Dc received for each application concerned at step P13. A notification NTF can be transmitted, upon completion of the processing, to the server SAC, giving it the result of the processing.

Then, at steps P14 and P15, the communication channel CDC between the card and the server SAC is closed similarly as at steps P9 and P10.

According to an alternative solution relating to the previous embodiments of the method of the invention, the agent Ag does not directly distribute the data Dc for the applications implemented in the card Cn, at steps E12 and P13. Then, the server SAC successively transmits to the card the content data Dc relating respectively to the applications concerned. In practice, for each application concerned, the server SAC transmits the content data processing command in response to an acknowledgement notification AQ of the processing of data Dc for the preceding application, transmitted by the card Cn.

When an application is distributed between the card and the mobile terminal, the so-called Midlet part of the application in the mobile terminal periodically interrogates the individual agent relative to the application in the card, so as to detect a triggering element EL. If such a triggering element is detected, the Midlet opens the communication channel at steps E3, P3 with the server SAC, then transmits at least the request Rq delivered by the agent. Subsequently, at step E11, P12 the data Dc transmitted by the server are received by the Midlet in the terminal which transmits them back to the agent in the card.

For the preceding embodiments and their alternative solutions, the exchanges of the data Dc, of the notifications NTF, of the couples {DDC, Idc}, of the identifiers IDc and of the acknowledgements AQ between the card and the server can be made secure. Such secured exchanges are carried out by an authentication between the card Cn and the server SAC and/or a ciphering of the various exchanged data.

The invention is not limited to the downloading of data in chip cards of the UICC type. A chip card in which data are to be downloaded can also be a card included in a portable computer connected to a mobile terminal or a payment card, an electronic paying card or any other additional card included in a mobile terminal. According to other alternative solutions, the invention also applies to other portable communicating electronic objects, such as communicating personal digital assistants PDA. The invention can even be applied to mobile terminals targeted by a campaign for which the data to be downloaded can concern a game to be saved in the nonvolatile memory of the EEPROM type of the mobile terminals.

The invention described here relates to a method and a system for downloading content data available in a server mean to portable communicating objects. According to a preferred implementation, the steps of the method of the invention are determined by the instructions of a program integrated in the system and more particularly partly in the server mean and partly in the portable communicating objects. The program includes program instructions which, when said program is loaded and executed in the system, the operation of which is then commanded by the execution of the program, carry out the steps of the method according to the invention.

As a consequence, the invention can also be applied to a program and more particularly to a program in or on an information medium, adapted to implement the invention.

The invention claimed is:

1. A method for downloading content data available in a server means to portable communicating objects via a radio communication network during a data downloading campaign in which a portable communicating object initiates downloading of data to said object upon the transmission of a content availability request to the server means, as soon as at least one request transmission triggering element fulfills a rule stored in the portable communicating object, wherein the portable communicating object performs the following steps consisting in:

determining, upon reception of a response to the content availability request, whether content data are available by comparing data characterizing the portable communicating object to content descriptions which are associated with the content data stored in the server means and transmitted by the server means in response to the content availability request, and transmitting content identifiers relating to the determined available content data, to cause the server means to transmit said determined available content data to the portable communicating object.

2. A method according to claim 1, wherein upon reception of the content data from the server means, the portable communicating object processes the received content data and transmits a notification to the server means.

3. A method according to claim 1, wherein the server means successively transmits, for each of the applications implemented in the portable communicating object, a content data processing command in response to an acknowledgement notification of the data processing for the preceding application, transmitted by the portable communicating object.

4. A system for downloading content data available in a server means to portable communicating objects via a radio communication network during a data downloading campaign, comprising, in each portable communicating object, means for initiating a data downloading to said object via the transmission of a content availability request to the server means, as soon as at least one request transmission triggering element fulfills a rule stored in portable communicating object, and wherein each portable communicating object includes means for determining, upon reception of a response to the content availability request, whether content data are available by comparing data characterizing the portable communicating object with content descriptions which are associated with the content data stored in the server means and transmitted by the server means, in response to the content availability request, and means for transmitting content identifiers relating to the determined available content data, to cause the server means to transmit said determined available content data to the portable communicating object.

5. A system according to claim 4, wherein the communicating objects are user chip cards removable from mobile terminals.

6. A system according to claim 4, wherein the communicating objects are mobile terminals.

7. A system according to claim 4, wherein the radio communication network is a code division multiple access network.

8. A non-transitory computer-readable medium having encoded thereon a program capable of being implemented in a communication system for downloading content data available in a server means to portable communicating objects via a radio communication network during a data downloading campaign, the program comprising, instructions for initiating from a portable communicating object the downloading of data to said object upon the transmission of a content availability request to the server means, as soon as at least one requested transmission triggering element fulfills a rule stored in the portable communicating object, and wherein the program further comprises instructions for determining, upon reception of a response to the content availability request, whether content data are available by comparing data characterizing the portable communicating object with content descriptions which are associated with the content data stored in the server means and transmitted by the server means in response to the content availability request, and sending content identifiers relating to the data to the determined available content data, to cause the server means to transmit said determined available content data to the portable communicating objects.

9. A method for downloading data content available from a server to a portable communicating object via a radio communication network, comprising:

detecting, at the portable communicating object, a triggering condition;

in response to detecting the triggering condition, transmitting a content availability request from the portable communicating object to the server;

receiving a response to the request that contains descriptions of content data stored in the server;

comparing the content descriptions in the received response to data characterizing the portable communicating object;

determining, from said comparison, whether content data is available for the portable communicating object; and transmitting content identifiers relating to content data that is determined to be available, from the portable communicating object to the server, to cause the server to transmit said determined available content to the portable communicating object.

10. A non-transitory computer-readable medium having stored thereon program instructions which, when executed by a processor in a portable communicating object, cause the portable communicating object to perform the following operations:

detect a triggering condition;

in response to detecting the triggering condition, transmit a content availability request from the portable communicating object to the server;

receive a response to the request that contains descriptions of content data stored in the server;

compare the content descriptions in the received response to data characterizing the portable communicating object;

determine, from said comparison, whether content data is available for the portable communicating object; and transmit content identifiers relating to content data that is determined to be available, from the portable communicating object to the server, to cause the server to transmit said determined available content to the portable communicating object.

* * * * *